(12) United States Patent
Lee et al.

(10) Patent No.: US 6,215,905 B1
(45) Date of Patent: Apr. 10, 2001

(54) VIDEO PREDICTIVE CODING APPARATUS AND METHOD

(75) Inventors: Sang-Hee Lee; Jae-Kyoon Kim, both of Seoul; Chel-Soo Park, Kyoungki-do; Joo-Hee Moon, Seoul, all of (KR)

(73) Assignee: Hyundai Electronics Ind. Co., Ltd. (KR)

( * ) Notice: Subject to any disclaimer, the term of this patent is extended or adjusted under 35 U.S.C. 154(b) by 0 days.

(21) Appl. No.: 08/940,937

(22) Filed: Sep. 30, 1997

(30) Foreign Application Priority Data

Sep. 30, 1996 (KR) .................................................. 96-42882

(51) Int. Cl.[7] ................................. G06K 9/36; H04B 1/66
(52) U.S. Cl. .......................... 382/238; 382/236; 382/243; 375/240.16; 375/240.08
(58) Field of Search ..................................... 382/238, 236, 382/243, 242, 239; 348/416, 402, 700; 358/539; 375/240.16, 240.12, 240.13, 240.15, 240.08

(56) References Cited

U.S. PATENT DOCUMENTS

| | | | |
|---|---|---|---|
| 5,166,987 | * 11/1992 | Kageyama | 382/239 |
| 5,227,878 | * 7/1993 | Puri et al. | 348/416 |
| 5,557,538 | 9/1996 | Retter et al. | 348/402 |
| 5,563,726 | * 10/1996 | Suzuki et al. | 358/539 |
| 5,737,451 | * 4/1998 | Gandhi et al. | 382/239 |
| 5,778,100 | * 7/1998 | Chen et al. | 382/243 |
| 5,790,196 | * 8/1998 | Sun et al. | 382/239 |
| 5,870,754 | * 2/1999 | Dimitrova et al. | 707/104 |

* cited by examiner

Primary Examiner—Thomas D. Lee
Assistant Examiner—Wenpeng Chen
(74) Attorney, Agent, or Firm—Lawrence G. Kurland, Esq.; Bryan Cave LLP (57) ABSTRACT

A predictive coding in a video coding system, which can enhance the coding efficiency by predictively coding DC coefficients of a block to be coded using DC gradients of a plurality of previously coded neighboring blocks. The predictive coefficient is selected according to the difference between the quantized DC gradients (coefficients) of a plurality of neighboring blocks of the block to be coded, and the DC coefficient of the block to be coded is predictively coded by the selected predictive coefficient, thereby enhancing the coding efficiency.

27 Claims, 10 Drawing Sheets

VIDEO PREDICTIVE CODING APPARATUS AND METHOD

BACKGROUND OF THE INVENTION

1. Field of the Invention

The present invention relates to predictive coding for a video encoding system, and more particularly, to a video predictive coding apparatus and method thereof, which can enhance the coding efficiency by predictively coding DC coefficients of a block to be coded using DC gradients of a plurality of previously coded neighboring blocks.

2. Description of the Related Art

In general, in conventional standards for video data compression such as MPEG-1, MPEG-2, JPEG, H.261, H.263 and so on, which adopts a block-oriented coding method, intra-mode blocks (to be referred to as intra blocks, hereinafter) which does not use a time- directional prediction, are coded and transmitted to a decoder by a texture coding using a 8H8 DCT (Discrete Cosine Transform) for reducing spatial redundancy of a signal.

Considerable parts of overall data to be transmitted are generated during the texture coding. Thus, the performance of an encoder is greatly affected by efficiently coding the data generated during the texture coding.

According to the H.263 method, in the case of an intra block, DC coefficients are quantized with a quantization step size of 8 into 8 bits after performing an 8H8 DCT, transmitted by performing a PCM (Pulse Code Modulation) on the same. According to the MPEG-2 method, to enhance the coding efficiency of DC coefficients, a difference between a quantized DC coefficient of a directly previous block having a relatively high spatial correlation and that of a current block, is transmitted in zig-zag scanning (luminance blocks) and progressive scanning (chrominance block) orders, as shown in FIG. 2.

Here, the zig-zag scanning and progressive scanning are dependent upon the coding order of a macroblock (16H16 pixels) in a frame.

Figure 2:
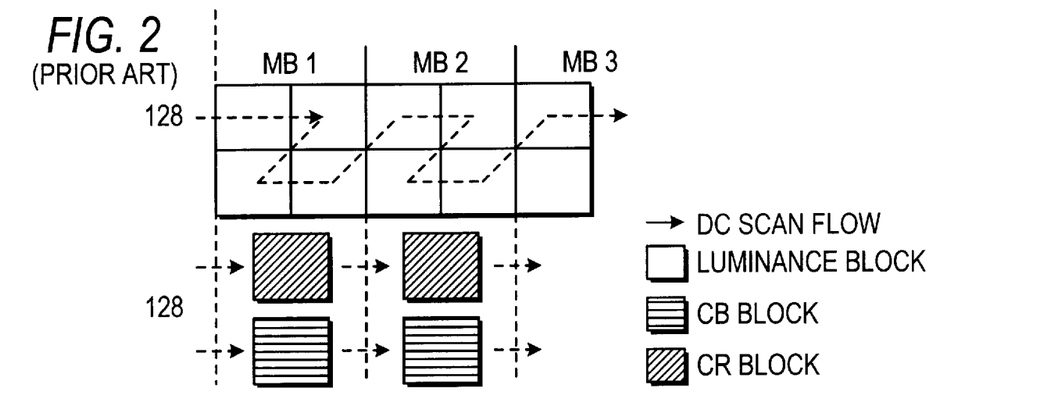
FIG. 2 is a sequence diagram of a conventional predictive coding of MPEG-2 DC coefficients.

In the MPEG-2, if the X-axis coordinate of the macroblock to be coded is 0, that is to say, if there is no block previously coded spatially), the predictive coded value (DC value), for the first luminance block in the macroblock, is 128, as shown in FIG. 2. Also, for the chrominance block, the DC value is 128.

Figure 1:
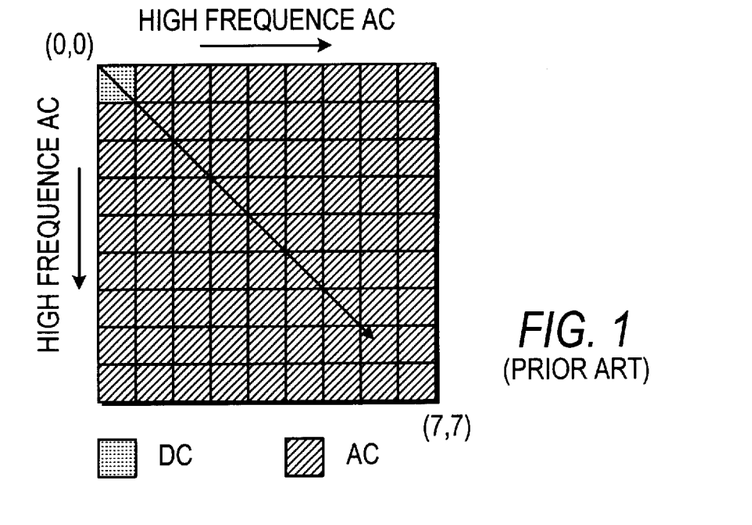
FIG. 1 is a diagram showing positions of DC and AC coefficients after performing a conventional DCT.

The 8H8 DCT is performed in an encoder, as expressed in the following equation (1), and IDCT (Inverse DCT) is performed in a decoder (and decoding parts for the reconstructed signal in the encoder), as expressed in the following equation (2). After performing DCT, DC and AC coefficients are arranged, as shown in FIG. 1.

Here, the DC coefficients correspond to F(0,0) of the equation (1), and the AC coefficients correspond to the remaining ones except the F(0,0).

$$F(u, v) = 1/4C(u)C(v) \sum_{x=0}^{7} \sum_{y=0}^{7} f(x, y)\cos[\pi(2x+1)u/16] \cos[\pi(2y+1)v/16] \quad (1)$$

$$F(x, y) = 1/4 \sum_{x=0}^{7} \sum_{y=0}^{7} C(u)C(v)F(u, v)\cos[\pi(2x+1)u/16] \cos[\pi(2y+1)v/16] \quad (2)$$

where u, v, x and y are 0, 1, 2, . . . 7, respectively, x and y are spatial positions in a pixel domain, u and v are spatial positions in a transform domain, u and x are horizontal indices, and v and y are vertical indices. Also, $C(u),C(v)=1/\sqrt{2}$ for u,v=0, and 1 otherwise (See ITU-T Recommendation H.263 Annex A: Inverse Transform Accuracy Specification, 6.2.4: Inverse Transform).

Also, f(x, y) represents video signal values within a 8H8 block, and F(u, v) are DC and AC coefficients calculated from the equation (1). Also, F(u, v) of the equation (2) are DC and AC coefficients coded by the coder.

Figure 3:
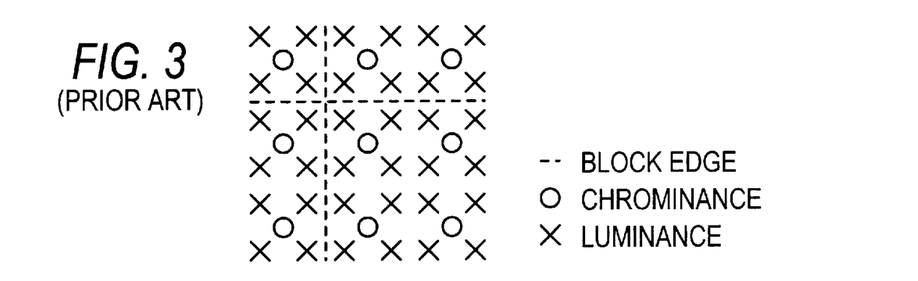
FIG. 3 shows a general 4:2:0 video format.

FIG. 3 shows a macroblock with a 4:2: Format, in a block-oriented coding method used in the conventional standards such as MPEG-1, MPEG-2, H.263, etc.

Here, the 4:2:0 video format represents ratio of sampling frequencies of three components, luminance information Y, and chrominance information Cb and Cr. The ratio of 4:2:0 is taken as a representative value of 4:2:0 and 4:0:2, which are alternative ratios of odd and even lines.

Also, the macroblock is composed of each 16 pixels horizontally and vertically, and is largely classified into four luminance blocks, i.e., L1 (Block 1 of luminance), L2 (Block 2 of luminance), L3 (Block 3 of luminance), and L4 (Block 4 of luminance), and two chrominance blocks, i.e., Cb and Cr. The respective pixels of C1(=Cb) and C2(=Cr) correspond to the positions of luminance components sub-sampled horizontally and vertically at the ratio of 2:1, which is referred to as 4:2:0 video format, as shown in FIG. 3.

In the MPEG-2 or MPEG Video verification model version 2, during a texture coding, in the case of an intra frame (or intra picture) having a high spatial (intra-picture) correlativity of luminance and chromance values, DC predictive coding is performed in the consideration of only one neighboring block Because this prediction method does not sufficiently consider the characteristics of texture signals of the neighboring blocks of the block to be coded, but only the coding order of the block or the macroblock as mentioned above, the coding efficiency of the texture coding (especially DC coefficients) is low.

SUMMARY OF THE INVENTION

To solve the above problem, it is an object of the present invention to provide a predictive coding method, which can enhance the coding efficiency by predictively coding DC coefficients of a block to be coded using DC gradients of a plurality of previously coded neighboring blocks.

It is another object of the present invention to provide a predictive encoder, which can enhance the coding efficiency by predictively coding DC coefficients of a block to be coded using DC gradients of a plurality of previously coded neighboring blocks.

To accomplish the first object of the present invention, there is provided a block based video coding method, wherein predictive coefficients are selected depending on the difference between gradients of DC coefficients of a plurality of neighboring blocks of a block to be coded.

To accomplish the second object, there is provided a block based video coding apparatus comprising: an object boundary block padding portion for receiving a video signal and original shape information, filling non-object parts with a mean value of object parts; a DCT portion for receiving the video signal output from the object boundary block padding portion to perform a DCT, quantizing the transform coefficient and outputting the same; a transform coefficient and video information encoder for predictively coding DC coefficients using a spatial correlation between the transform coefficient of an arbitrary block output from the DCT portion, and the coded DC values of a plurality of neighboring blocks of the blocks to be coded; an IDCT portion for receiving the quantized transform cofficients from the DCT portion and inversely quantizing the received coefficients, filtering the transform coefficient and performing an IDCT; and a padded data eliminating portion for receiving the video signal output from the IDCT portion and reconstructed shape information, eliminating the padded data, and outputting the decoded video data.

Here, the transform coefficient and video information encoder includes a DC coefficient storage portion for storing the DC coefficient obtained from the DCT portion, a predictive block selector for selecting a referenced block to be used in prediction by the indices of three neighboring blocks of the current block, obtained from the DC coefficient storage portion, and a DPCM encoder for DPCM-coding the predictive value obtained from the predictive block selector and the quantized DC coefficient of the current block, obtained from the DCT portion.

Also, the predictive block selector includes a memory for storing indices for three neighboring blocks of the current block, obtained from the DC coefficient storage portion, first and second subtractors for selectively taking two among indices for the three blocks and mutually subtracting the same, first and second absolute value calculators for calculating absolute values output from the first and second subtractors, and a comparator for comparing the respective absolute values obtained from the first and second absolute value calculators and generating a selection control signal for selecting a predictive block according to the comparison result.

BRIEF DESCRIPTION OF THE DRAWINGS

The above objects and advantages of the present invention will become more apparent by describing in detail a preferred embodiment thereof with reference to the attached drawings in which.

DESCRIPTION OF THE PREFERRED EMBODIMENT(S)

In MPEG-4, which is under normalizing work, VOP (video Object Plane) based video signal coding methods, including the conventional block-oriented coding method, are currently investigated. The development of MPEG-4 is initiated by the necessity of supporting next-generation video and audio applications, which cannot be supported by the conventional standards.

The MPEG-4 provides novel methods for communicating, accessing and manipulating video and audio data, e.g., an object-oriented interactive function and connection through networks having different features. Also, the MPEG-4 provides useful operating characteristics under a communication environment where error are liably generated or a low-transmission rate environment. Further, natural video and audio, and artificial video and audio can be altogether coded and manipulated by integrating computer graphics technology.

Briefly, the MPEG-4 must support all functions required and expected by various application fields. Therefore, the MPEG-4 will have an extendible and open structure so that it can support the functions requested by the every possible application field, which has been newly developed or to be developed, at a low cost but with performance. Among the requested functions, coding efficiency is important for low cost, efficient transmission and storage.

As the applications expected to adopt the MPEG-4, there are IMM (Internet Multimedia), IVG (Interactive Video Games), IPC (Interpersonal Communications) such as a video conference or video-phone, ISM (Interactive Storage Media), MMM (Multimedia Mailing), WMM (Wireless Multimedia), NDB (Networked Database Service) using ATM network, RES (Remote Emergency Systems), RVS (Remote Video Surveillance) and so on.

To support the conventional applications or expected applications, there is a need for a video coding technology by which users can communicate with only their desired objects in a video, access thereto for searching and reading, and edit for cutting and pasting. In order to meet such demands, as a new video and audio coding technology, the MPEG-4 is currently under study.

The VOP is a coding unit for coding only a desired object by partitioning a picture in the unit of objects. For example, if a chile and a cat are present in a screen, the screen can be partitioned into parts of a background VOP0, a child VOP1 and a cat VOP2. Thus, coding can be performed by VOP. To this end, shape information which can differentiate the respective objects from one another is necessary. The shape information is different for the respective VOPs.

Figure 5:
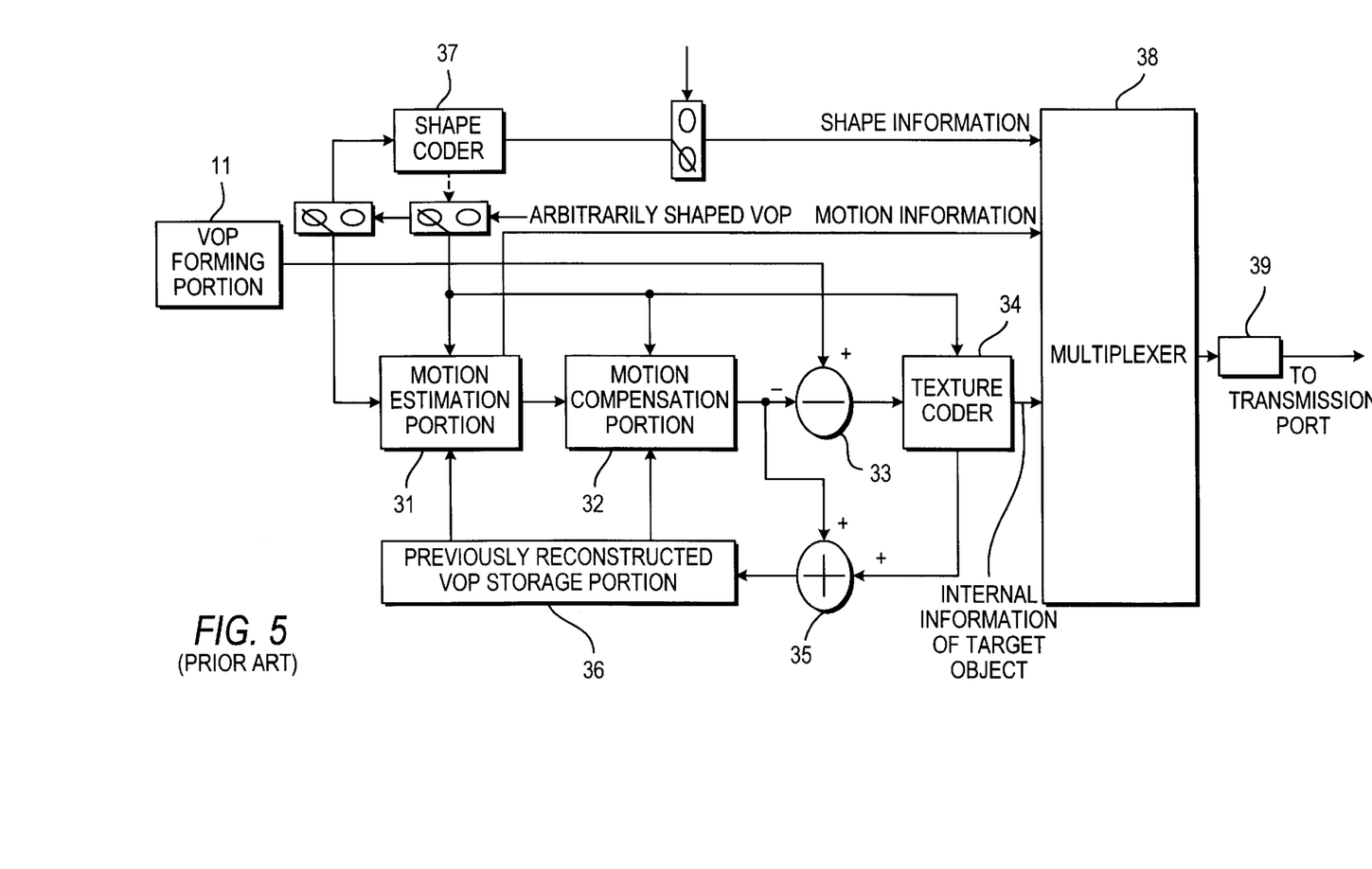
FIG. 5 is a schematic diagram of a VOP video coder of MPEG-4 primarily fixed by the international standard subsidiary organization.

FIG. 5 shows a VOP-based video encoder (hereinafter VOP encoder) of MPEG-4, which has a structure different from that of H.261, H.263, MPEG-1 or MPEG-2, which are conventional video coding standards. Particularly, the remarkable difference is introduction of shape coder and VOP concepts.

In the video object plane (VOP) video encoder, if VOPs for the videos formed by the VOP forming portion 11 are input to a motion estimation portion 31, the motion estimation portion 31 estimates the motion in the unit of macroblocks from the input VOPs. Also, the motion information estimated from the motion estimation portion 31 is input to a motion compensation portion 32 to compensate the motion thereof. The VOP to be compensated by the motion compensation portion 32 is input to a subtractor 33 together with the input VOP formed by the VOP forming portion 11, to then detect difference value therebetween. The difference value detected by the subtractor 33 is input to a texture encoder 34 so that the internal information of an object to be coded into 8H8 blocks of the macroblock.

The VOP (video object plane) to be compensated by the motion compensation portion 32 and the internal information of the object to be coded and reconstructed by the texture coder 34 are input to an adder 35 to then be added. The output signal of the adder 35 is input to a previously reconstructed VOP storage portion 36 to then output a previously reconstructed VOP which is a directly previous picture of a current picture. Also, the previously reconstructed VOP output from the previously reconstructed VOP storage portion 36 is input to the motion estimation portion 31 and the motion compensation portion 32 to be used for motion estimation and motion compensation. The VOP formed by the VOP forming portion 11 is input to the shape coder 37 so that the shape information is coded. Here, the usage of the shape coder 37 can be switched according to the applications to which the VOP coder is adopted. For easier explanation, information flows related to shape information are represented by a dotted line. As indicated by a dotted line, the output signal of the shape coder 37 is input to the motion estimation portion 31, motion compensation portion 32 and texture coder 34 to be used for motion estimation, motion compensation and texture coding of the unit of objects.

The motion information estimated by the motion estimation portion 31, internal information of the object coded by the texture coder 34 and shape information coded by the shape coder 37 are applied to a multiplexer 38 to then be multiplexed.

Hereinafter, the operation of the VOP coder according to a preferred embodiment of the present invention will be described.

Figure 13:
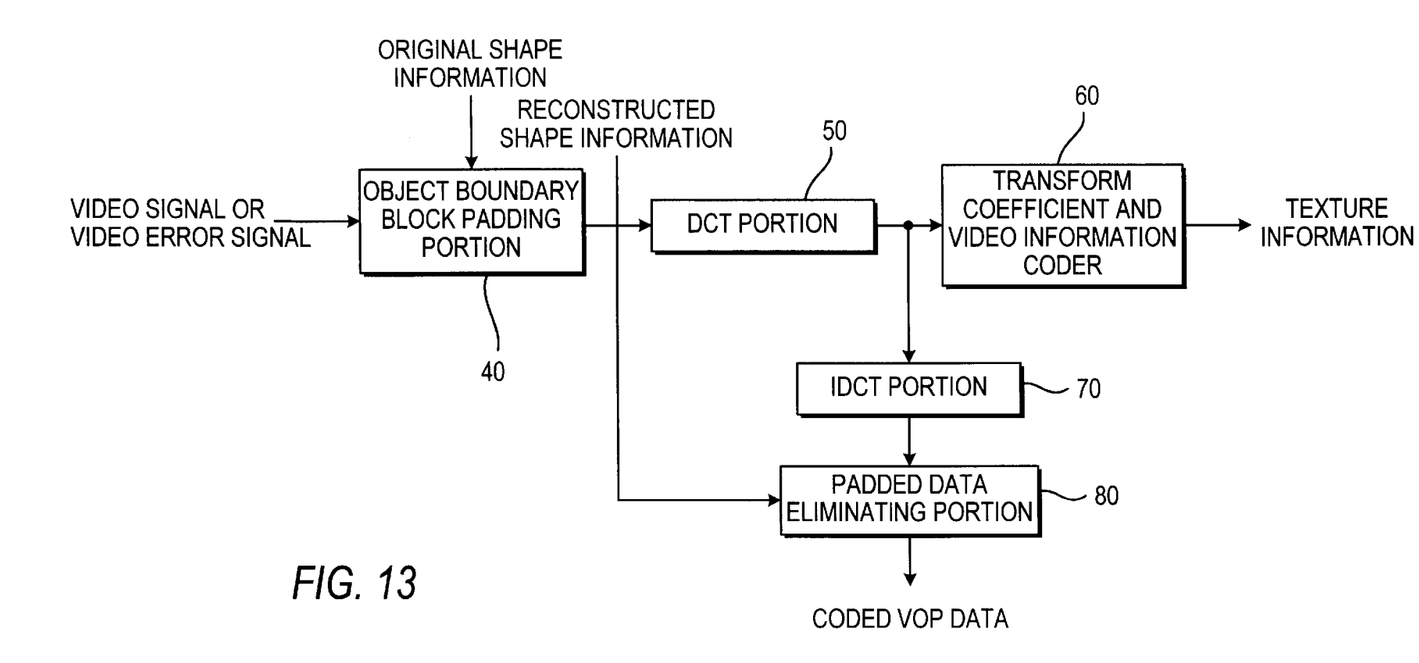
FIG. 13 is a schematic diagram of a texture encoder according to the present invention.

FIG. 13 is a schematic diagram of a texture coder according to the present invention.

As shown in FIG. 13, the texture coder includes an object boundary block padding portion 40 for receiving a video signal and original shape information, a DCT portion 50 for receiving the video signal output from the object boundary block padding portion 40 to perform a DCT, quantizing the transform coefficient and outputting the quantized coefficient, a transform coefficient and video information coder 60 for predictively coding DC coefficients using a spatial correlation (gradient) among the coded DC values of a plurality of neighboring blocks of the block to be coded, an IDCT portion 70 for receiving the quantized transform coefficient from the DCT portion 50 and inversely quantizing the same, filtering the transform coefficient and performing an IDCT, and a padded data eliminating portion 80 for receiving the video signal output from the IDCT 70 and reconstructed shape information, eliminating the padded data, and outputting the reconstructed object signal.

Figure 14:
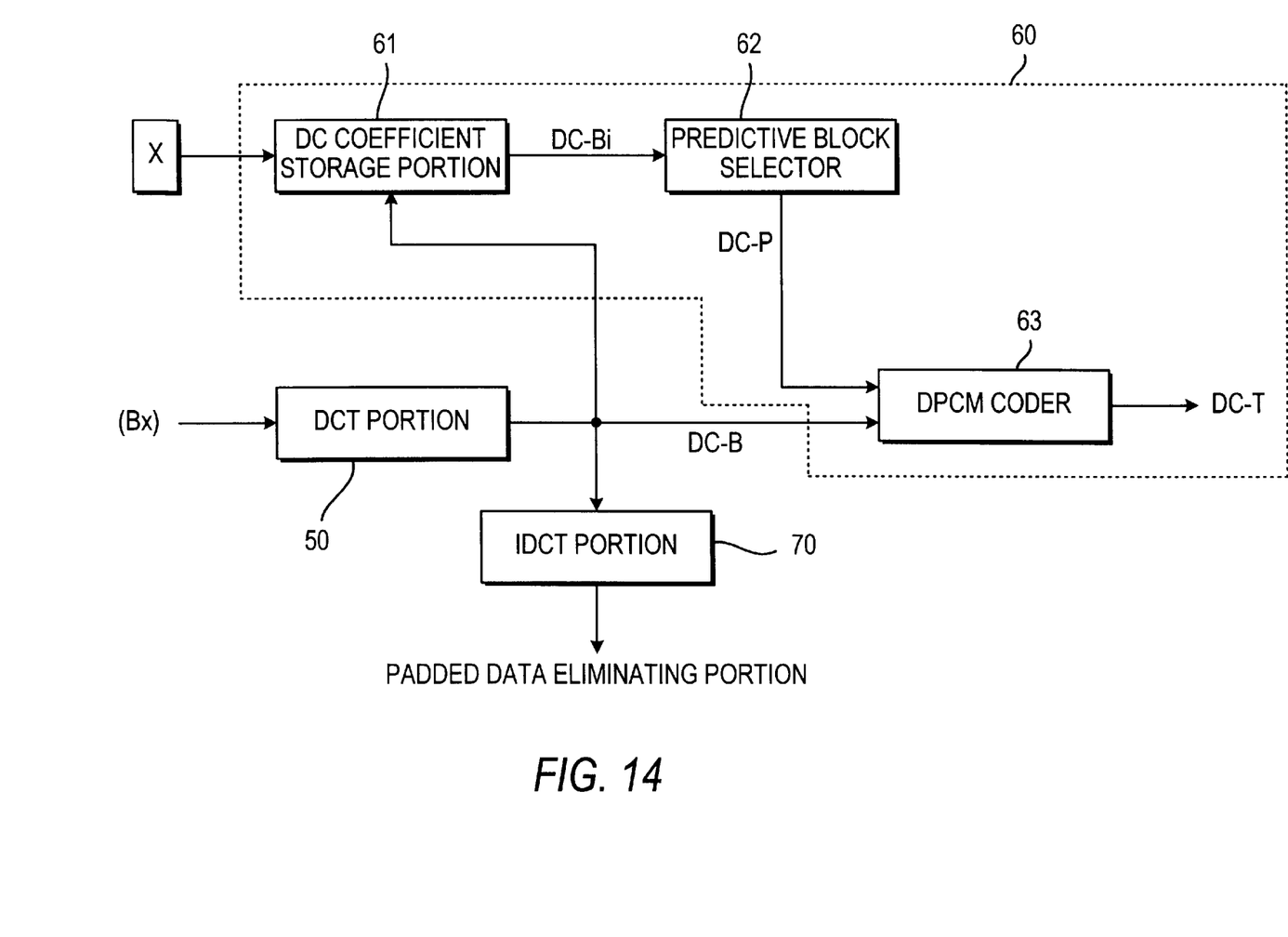
FIG. 14 is a detailed block diagram of a transform coefficient and video information encoder shown in FIG. 13.

The transform coefficient and video information coder 60 includes a DC coefficient storage portion 61 for storing the DC coefficient (DC-B) obtained from the DCT portion 50, a predictive block selector 62 for selecting a predictive block by using the DC coefficients (DC-Bi) of three neighboring blocks of the current block, obtained from the DC coefficient storage portion 61, and a DPCM coder 63 for DPCM-coding the predictive value DC-P obtained from the predictive block selector 62 and the quantized DC coefficient of the current block, obtained from the DCT portion 50, as shown in FIG. 14.

In FIG. 14, x which is input to the DC coefficient storage portion 61 is an index for the position of the block B of the overall blocks, DC-Bi is an index for the three neighboring blocks of the current block Bx, where i=1, 2 and 3.

Figure 15:
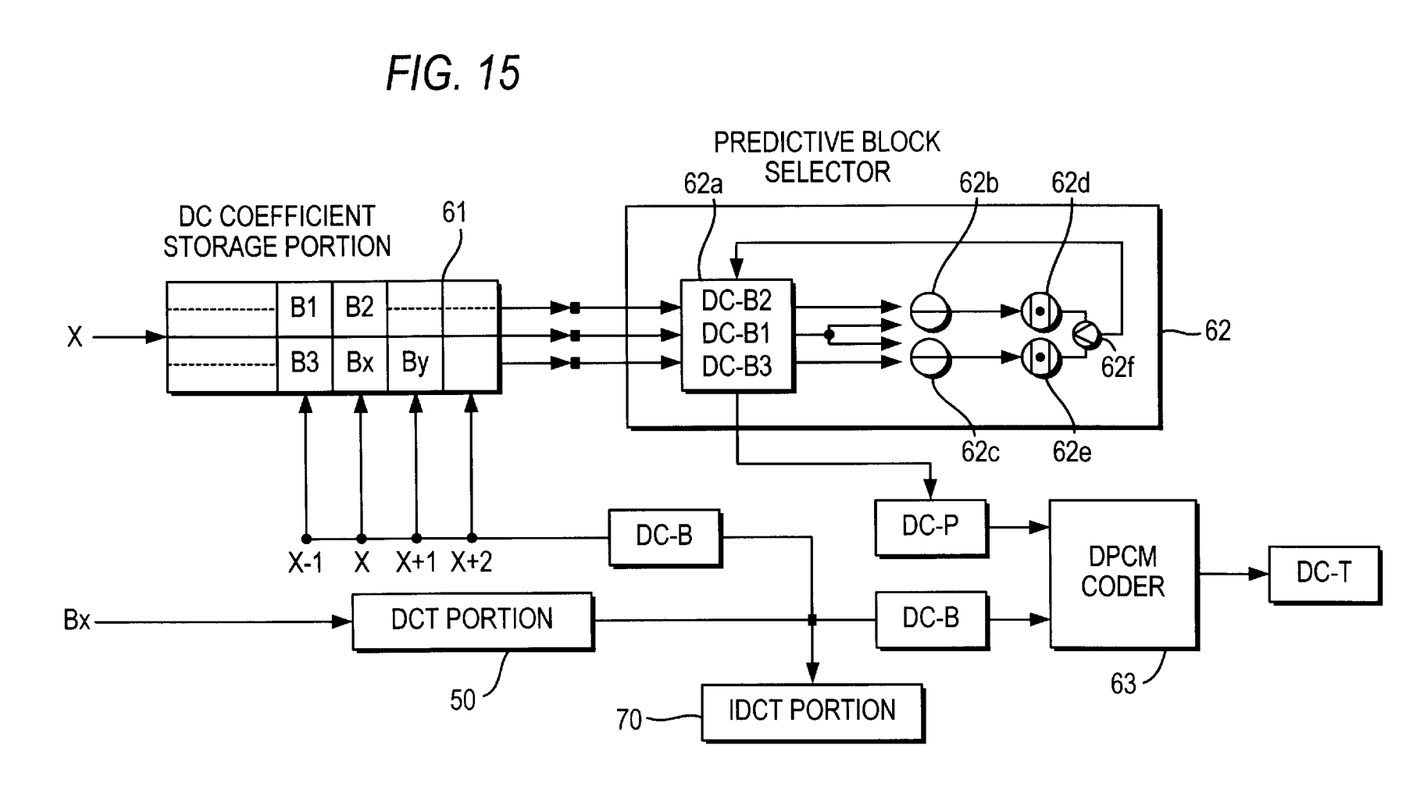
FIG. 15 is a detailed block diagram of a predictive block selector shown in FIG. 14.

FIG. 15 shows a detailed block diagram of the predictive block selector 62, which includes a memory 62a for storing DC coefficients three neighboring blocks of the current block, obtained from the DC coefficient storage portion 61, first and second subtractors 62b and 62c for selectively taking two among indices for the three blocks and mutually subtracting the same, first and second absolute value calculators 62d and 62e for calculating absolute values output from the first and second subtractors 62b and 62c, a comparator 62f for comparing the respective absolute values obtained from the first and second absolute value calculators 62d and 62e, and generating a selection control signal for selecting a predictive block according to the comparison result.

According to the present invention having the aforementioned configuration, an input video signal is DCT-performed and then a DC coefficient is predictively coded using a spatial correlation (gradient) between coded DC values of a plurality of neighboring blocks of a current block to be coded, for enhancing the coding efficiency of the quantized DC coefficient.

Here, the gradient indicates the deviation degree between another two points, on the basis of a point.

The three points are mean values DC coefficients of the respective blocks. On the basis of a block, the gradient is calculated to understand the deviation degree of a basis point and neighboring blocks, i.e., the difference of magnitudes of —DC— signal values within the block.

Figure 11:
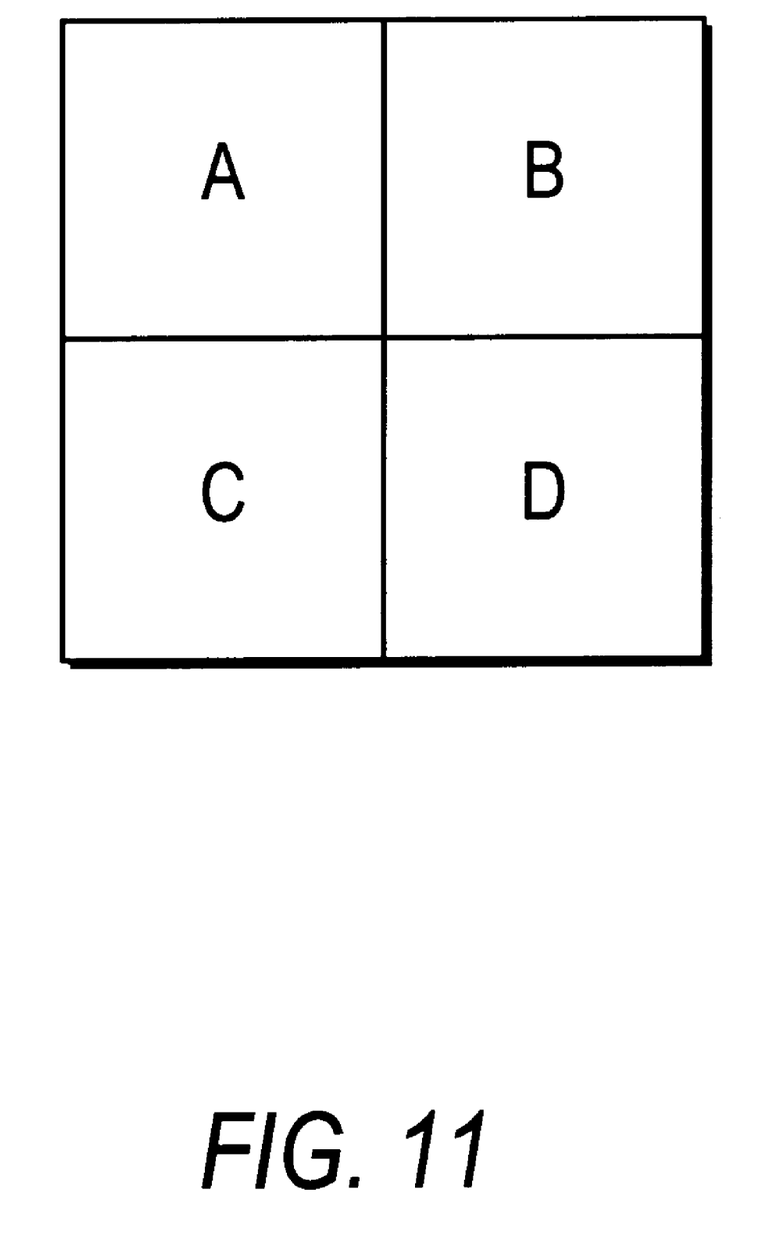
FIG. 11 is a diagram for explaining the background of using gradients during prediction, according to the present invention.

In FIG. 11, A is a point block which is the basis for calculating the gradient, B is a top block, C is a left block and D is a block to be coded. Here, the target to be coded is the DC value of the block D quantized after performing DCT (to be referred to as a DCQ). Similarly, the DC values of A, B and C blocks are transmitted to a decoder after already being coded.

In the conventional standards such as MPEG-1, MPEG-2 or H.263, the method of transmitting the coded values after performing the texture coding, to the decoder, will now be described.

First, transform coding is performed using 8H8 DCT (Discrete Cosine Transform) in the unit of blocks. This is for enhancing the coding efficiency by reducing the spatial redundancy between signals within a block.

Second, the DCT coefficient generated in the first step is quantized using a value (a quantization step size) defined according to a rate control policy and method, to then be coded. Typically, DC values are quantized with a quantization of step size of 8, and, AC values are quantized with a defined quantization step size, which is expressed in the following equation:

$$DCQ = DC/8 (\text{Level}=DCQ)$$

$$ACQ = AC/\text{q-step} (\text{Level}=ACQ)$$

where q-step is a quantiazation step size arbitrarily defined according to a rate control, which is permitted from 0–31), and the Level represents the value after being quantized.

Third, the DCQ and ACQ are transformed into values DCT and ACV to be transmitted to a decoder through a PCM (Pulse Code Modulation) or DPCM (Differential Pulse Code Modulation).

Fourth, the DCV and ACV are coded according to a VLC (Variable Length Code) which combines last, run and level according to a zig-zag scanning order, to then be transmitted. All DCV or ACV are encoded and transmitted to a decoder as a combination of three kinds, namely, a last indicative of whether or not the transform coefficient being currently encoded is the last non-zero transform coefficient, a run indicative of the number of successive zero transform coefficients preceding the current non-zero coefficient, and a level indicative of the magnitude of the current transform coefficient.

After the coding and transmission are performed in such a manner, decoding is performed in the reverse order of the first through fourth steps.

The DC value represents a characteristic of a signal (texture) of the corresponding block, and the characteristic of the texture of a block to be coded, i.e., the magnitude, is be known.

In addition, when the pixels of the block to be coded have the same value, the texture coding efficiency is the highest, which is because only the DC value exists.

Generally, signals within a picture are divided into many sections, and the boundary portions therebetween are exhibited as high frequencies during the transform coding. Therefore, during predictive coding using the DC information (value) of neighboring blocks, it is very important to know the high-frequency boundaries exactly for minimizing a differential value and reducing the quantity of transmission bits.

When the DPCM is performed between blocks positioned in the high-frequency boundary, at worst, much more bits may be generated, compared to the case when the PCM is performed. Therefore, if the gradient of DC values of the neighboring blocks to the block to be coded are used, the high-frequency boundary of the neighboring blocks of the target block to be coded can be known. Using the information, the DC differential value between blocks belonging to an identical section is coded, thereby maximizing the predictive coding efficiency.

Figure 12:
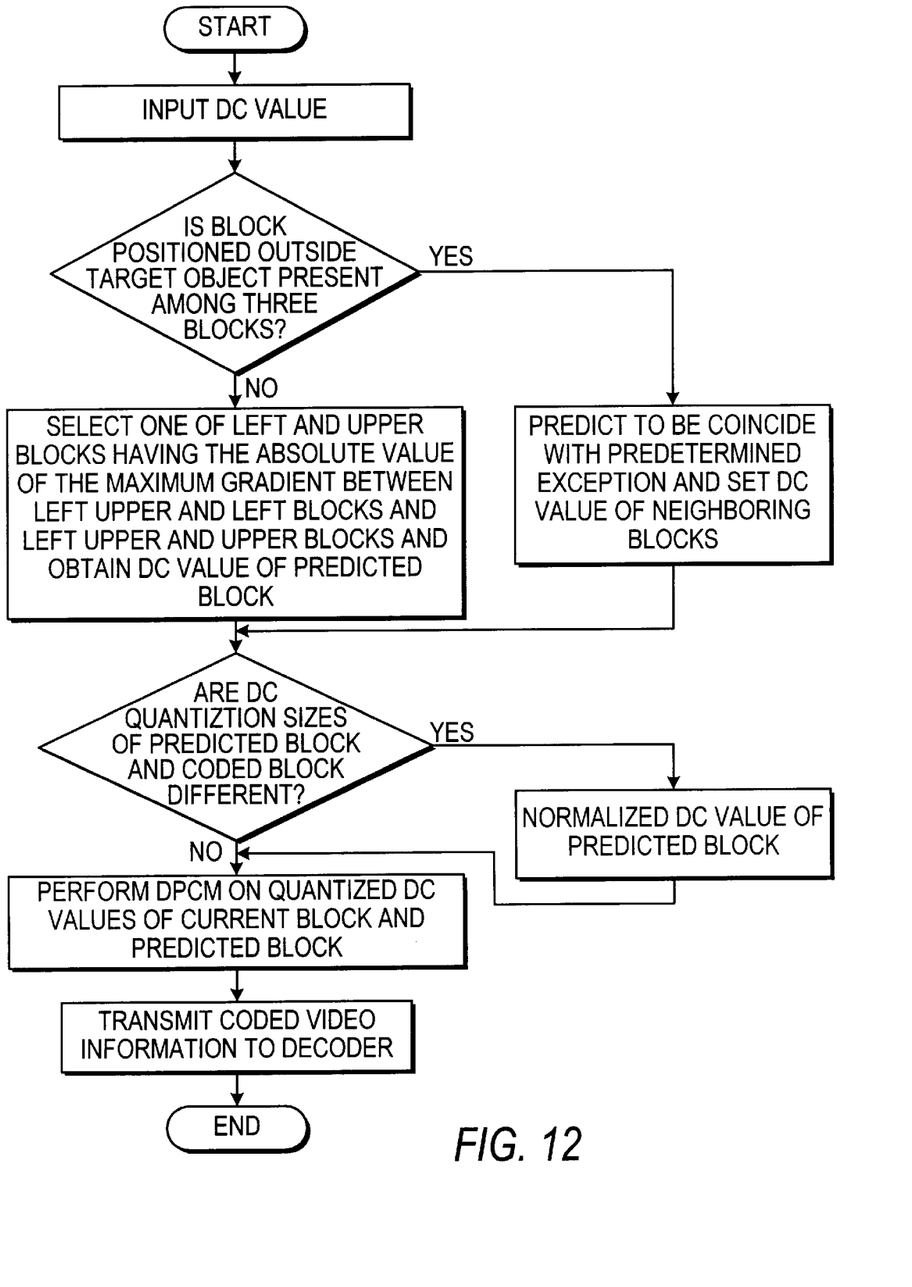
FIG. 12 is a flow diagram showing a predictive video coding procedure according to the present invention.

In the present invention using such a principle, as shown in FIG. 12, first, the quantized DC value (DC-B) is input from the DCT portion 50. Second, the indices of three neighboring blocks of the current block are selected from the DC coefficient storage portion 61, to then transmit the same to the predictive block selector 62. In object unit coding as discussed above, there may be a block that is not an object in one macroblock. In such a case where a block is outside of the object, DC values do not exist. Accordingly, different rules are required, which is described below. Moreover, whether a block is in or out of the object in object unit coding may be determined by the input of shape information to the predicitive block selector. Then the predictive block selector 62 detects whether one or more blocks among the three neighboring blocks are positioned outside the object.

Next, as the detection result, if a block is positioned outside the object, the predictive block and prediction coefficient are determined by the following exception rules. Since the predicitive block is determined using the information of neighboring blocks, this method may be implemented in a decoder. Accordingly, no additional information need be transmitted to determine the predictive block.

On the contrary, if three blocks are all positioned within the object, one of the left and upper blocks, having the larger absolute value of the gradient between the quantized DC values of a left upper block and a left block and a left upper block and a upper block, is selected as the predicted reference block, to then obtain the quantized DC value of the predicted block. Thereafter, it is detected whether the DC quantized steps of the reference block and coded block are different in DC quantization levels from each other. If different, the quantized DC value of the reference block is normalized by quantizing using the quantization step size of the block to be coded.

After the normalizing procedure or if the DC quantization levels of the predicted block and coded block are the same to each other, the DC value of the current block and the quantized DC value of the predicted block are DPCM-performed.

In the present invention coding procedures of six times in total are performed for each macroblock, i.e., four times for the luminance (L1, L2, L3 and L4) and two times for chrominance (C1 and C2), and the coding order is the same as that of MPEG-2.

Figure 6:
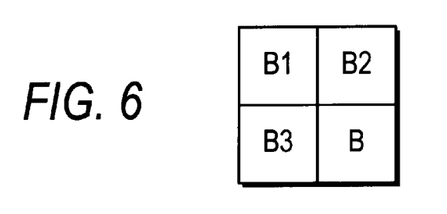
FIG. 6 is a diagram showing positions of a block (B) to be coded and neighboring blocks (B1, B2, B3), according to the present invention.

The three neighboring blocks B1, B2 and B3 of the block B currently being coded are defined for coding the DC coefficients, as shown in FIG. 6.

Here, for the convenience's sake, the block to be coded is indicated as B, the left upper block is indicated as B1, the upper block is indicated as B2 and the left block is indicated as B3. Three neighboring blocks, B1, B2, and B3 are already coded and transmitted to a decoder.

Also, it is assumed that the quantized DC coefficient of the block B is represented by DC_B, the DC coefficient of the block B1 is represented by DC_B1, the DC coefficient of the block B2 is represented by DC_B2, the DC coefficient of the block B3 is represented by DC_B3, and the predictive value for predictively coding the quantized DC coefficient DC_B of the block B is represented by DC_P, the predictively coded DC value for the current block B to be As mentioned above, DC-P is the quantized DC value of the predictive block using the quantization step size of the current block.coded and transmitted to the decoder is represented by DC_T. Then, the DC_T can be defined as follows:

$$DC\_T=(DC\_P- DC\_B) \text{ or}$$

$$DC\_T=(DC\_B- DC\_P) \tag{3}$$

Figure 4:
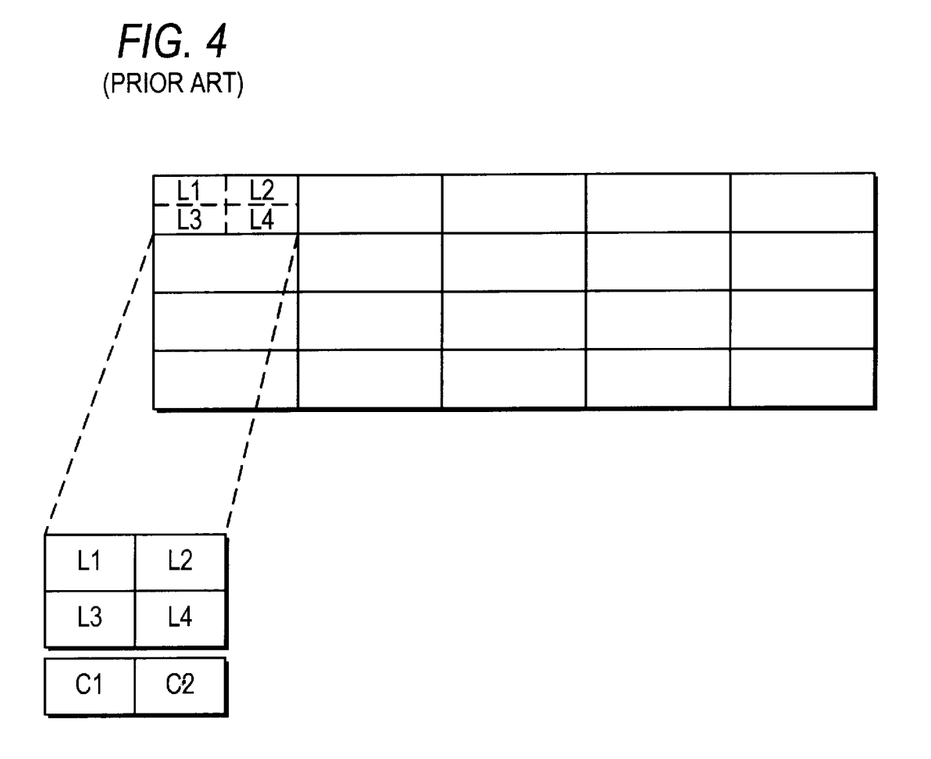
FIG. 4 is a diagram showing a macroblock in the general 4:2:0 video format.

When a picture is partitioned into 16H16 pixels in X and Y axes, i.e., by a macroblock size, if the X-axis coordinate of the macroblock is zero (the left boundary of a frame), the predictive coding values of the first luminance blocks L1 and L3 of FIG. 4 in the macroblock are set as 128, and the predictive coding values of the chrominance blocks C1 and C2 of FIG. 4 are all set as 128.

Also, if the Y-axis coordinate of the macroblock is zero (the upper boundary of a frame), the predictive coding values of the first luminance blocks L1 and L2 of FIG. 4 in the macroblock are set as 128, and the predictive coding values of the chrominance blocks C1 and C2 of FIG. 4 are all set as 128.

Under such conditions, in the case of a VOP or object based coding using the actual shape information, the DC predictive coding is performed as follows.

First, assuming that the block to be coded is represented by B, the quantized DC value DC-B output from the DCT portion 50 is input to the DC coefficient storage portion 61 and the DPCM encoder 63 of the transform coefficient and video information coder 60, respectively.

The DC coefficient storage portion 61 outputs DC coefficients DC-Bi(i=1, 2 and 3) of the three neighboring blocks B1, B2 and B3, already stored, using the index of input coefficient for the block B as indices X−1, X, X+1 and X+2—. For the selection of DC-Bi among the stored DC coefficients, the positioning index of the block B ( . . . , X−1, X, X+1, X+2. . . in FIG. 15) is used.

Then, as shown in FIG. 15, the predictive block selector 62 temporarily stores the DC coefficients of the three neighboring blocks in the memory 62a, and the first subtractor 62b mutually subtracts the DC coefficient DC-B1 of the block B1 and the DC coefficient DC-B2 of the block B2 and inputs the result value thereof to the first absolute value calculator 62d.

Also, the second subtractor 62c mutually subtracts the DC coefficient DC-B2 of the block B1 and the DC coefficient DC-B3 of the block B3 and inputs the result value thereof to the second absolute value calculator 62e.

Then, the first and second absolute value calculators 62d and 62e calculate the absolute values of the input values, and the absolute values are input to the comparator 62f, respectively. The comparator 62f compares two values, and transmits the result signal to the memory 62a via an address so that the DC coefficient of the reference block B to be coded is output for predictively coding the DC coefficient of the block B to be coded.

Accordingly, the memory 62a outputs the—predictives— value for predictively coding the DC coefficient of the block B corresponding to the address, and transmits the same to the DPCM encoder 63.

Then, the DPCM encoder 63 performs DPCM coding on the predictive value DC_P (quantized value using the quantization step size of the current block, if necessary) for predictively coding the input block B and the quantized DC coefficient DC_B of the block B, obtained from the DCT portion 50, and outputs the predictively coded DC value of the current block B to be transmitted to the decoder.

Hereinafter, the selection of a predictive block for DC predictive coding, depending on the presence of shape information of the neighboring blocks B1, B2 and B3 of the block B, and the DC predictive coding procedure of the current block using the selected DC value, will be described in more detail.

First, in the case when the neighboring blocks B1, B2 and B3 of the block B are all intrablocks, the absolute value |(*DC-B1)−(DC-B2*)| of the result of subtracting the DC coefficient DC_B2 of the block B2 from the DC coefficient DC_B1 of the block B1, is compared with that |(*DC-B1 & DC-B3*)| of the result of subtracting the DC coefficient DC_B3 of the block B3 from the DC coefficient DC_B1 of the block B1. Then, if |(*DC-B1)−DC-B2*)|<|(*DC-B1−DC-B3*)|, since the spatial correlation between the block B1 and the block B2 is large that is the spatial correlation between the block B3 and the block B is large. DC predictive coding is performed by selecting a predictive value DC_P for predictively coding the DC_B of the block B as the quantized DC coefficient DC_B3 of the block B3. Also, if |*DC-B1 & DC-B2*>*DC-B1 & DC-B3*|, DC predictive coding is performed by selecting a predictive value DC_P for predictively coding the DC_B of the block B as the quantized DC coefficient DC-B2 of the block B2 using the quantization step size of the block B.

Figure 7:
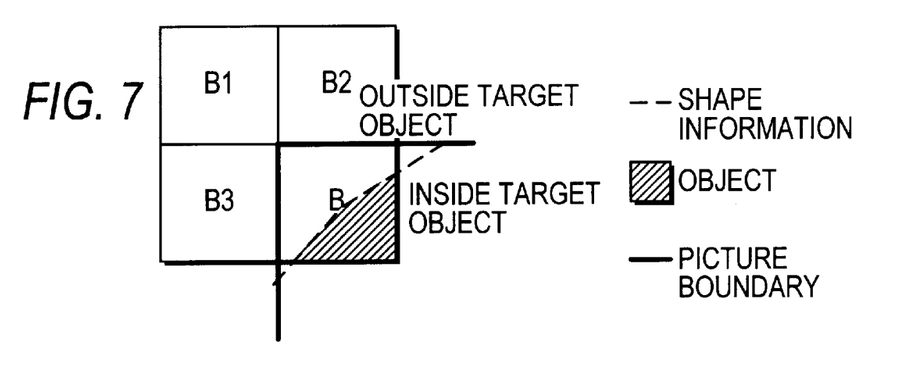
FIG. 7 shows a first example of the relation between a block to be coded and its neighboring blocks.

Next,—if the neighboring block B2 and B3 of the block B is outside the object, as shown in FIG. 7, the predictive value DC_P for predictively coding the DC_B of the block B is set as 128 to then perform DC predictive coding.

Figure 8:
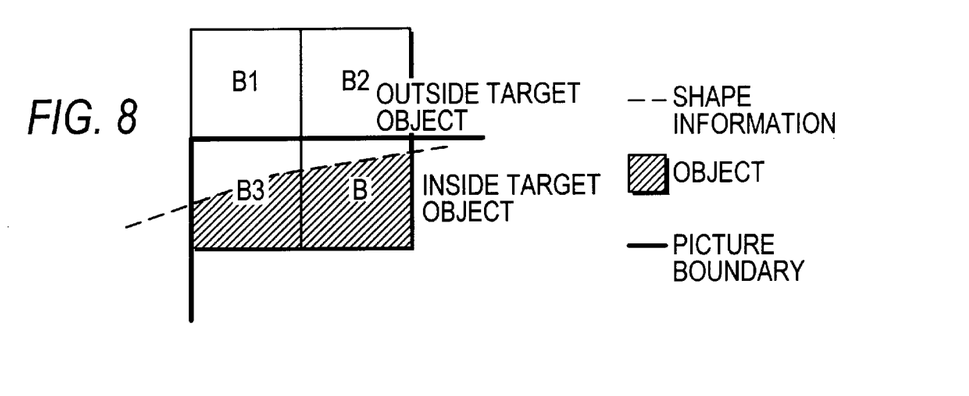
FIG. 8 shows a second example of the relation between a block to be coded and its neighboring blocks.

Also, as shown in FIG. 8, if shape information is present only in the block B3, the predictive value DC_P for predictively coding the DC_B of the block B is selected as the DC coefficient DC_B3 of the block B3 to then perform DC predictive coding.

Figure 9:
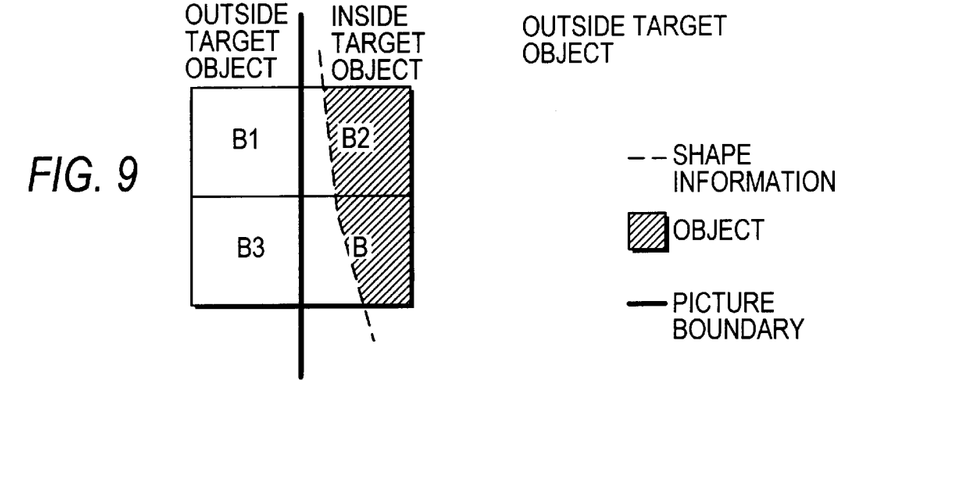
FIG. 9 shows a third example of the relation between a block to be coded and its neighboring blocks.

Similarly, as shown in FIG. 9, if shape information is present only in the block B2, the predictive value DC_P for predictively coding the DC_B of the block B is selected as the DC coefficient DC_B2 of the block B2 to then perform DC predictive coding.

Figure 10:
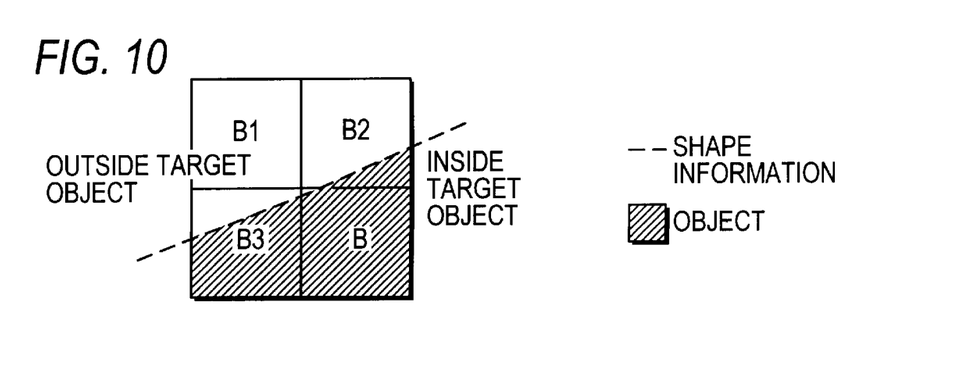
FIG. 10 shows a fourth example of the relation between a block to be coded and its neighboring blocks.

Also, as shown in FIG. 10, if shape information is present in the neighboring blocks B2 and B3 of the block B but is not present in the block B1, the predictive value DC_P for predictively coding the DC_B of the block B is selected as the DC coefficient DC_B3 of the block B3 or the DC coefficient DC_B2 of the block B2 to then perform DC predictive coding.

Alternatively, if shape information is present in the neighboring blocks B2 and B3 of the block B but is not present in the block B1, the predictive value DC_P is set as 128 to then perform DC predictive coding.

Now, there may exist exceptional circumstances probably generated when performing the coding using the shape information in the manner as described above, and the predictive coding method thereof will be described.

If shape information is not present in the neighboring blocks B2 and B3 of the block B to be coded but is present only in the block B1, the predictive value DC_P for predictively coding the DC_B of the block B is set as the quantized DC coefficient DC_B1 of the block B1 using the quantization step size of the block B, to then perform DC predictive coding. Otherwise, if shape information is present in the neighboring blocks B2 and B3 of the block B to be coded but is not present only in the block B1, the predictive value DC_B1 for predictively coding the block B1 is set as 128, to then obtain the predictive value DC_P for predictively coding the block B.

In other words, the absolute value |(*128-DC-B2*)| of the result of subtracting the DC coefficient DC-B2 of the block B2 from the predictive value DC_B1 for predictively coding the block B1 (128), is compared with that |(*128-DC-B3*)| of the result of subtracting the DC coefficient DC_B3 of the block B3 from the predictive value for predictively coding the block B1 (128), and DC predictive coding is performed by selecting a predictive value DC_P for predictively coding the DC_B of the block B as the DC coefficient DC_B3 of the block B3 if |(*128-DC-B2*) <*128 -DC-B3*)|. Otherwise, if |(*128-DC-B2*)|>|(*128& DC_B3*)|, the predictive value DC_P for predictively coding the DC_B of the block B is set as the DC coefficient DC_B2 of the block B2, to then perform DC predictive coding.

Next, another coding method for the probable exceptional circumstances may be considered, and the coding method thereof will now be described.

If shape information is not present in the blocks B2 and B3 but is present only in the block B1, the predictive value DC_P for predictively coding the DC_B of the block B is set as the DC coefficient obtained by adding 128 to the DC coefficient DC_B1 of the block B1, that is, DC_B1+128, and dividing the adding result by 2, that is, (DC_B1+128)/2, and then rounding off or cutting the fractions to the decimal places, to then perform DC predictive coding.

Also, if shape information is present only in the block B3, the predictive value DC_P for predictively coding the DC_B of the block B is set as the DC coefficient obtained by adding 128 to the DC coefficient DC_B3 of the block B3, that is, DC_B3+128, and dividing the adding result by 2, that is, (DC_B3+128)/2, and then rounding off or cutting the fractions to the decimal places, to then perform DC predictive coding.

If shape information is present only in the block B2, the predictive value DC_P for predictively coding the DC_B of the block B is set as the DC coefficient obtained by adding 128 to the quantized DC coefficient DC_B2 of the block B2, that is, DC_B2+128, and dividing the adding result by 2, that is, (DC_B3+128)/2, and then rounding off or cutting the fractions to the decimal places, to then perform DC predictive coding.

Further, if shape information is present in the blocks B2 and B3 but is not present in the block B1, the predictive value DC_P for predictively coding the DC_B of the block B is set as the DC coefficient obtained by adding the DC coefficient DC_B3 of the block B3 to the DC coefficient DC_B2 of the block B2, that is, DC_B2+DC_B3, and dividing the adding result by 2, that is, (DC_B2+DC_B3)/2, and then rounding off or cutting the fractions to the decimal places, to then perform DC predictive coding.

Heretofore, the coding method has been described in the case when the quantization step sizes of the block B and its three neighboring blocks B1, B2 and B3 are the same to one another. If the DC coefficient storage portion stores the quantized DC coefficient of the block B. B1, B2 and B3, and the quantization step sizes (to be referred to as Q_step, hereinafter) of the block B and its three neighboring blocks B1, B2 and B3 are different from one another, DC-B is predictively coded using the aforementioned coding method after normalizing the DC values of the four blocks B, B1, B2 and B3.

Here, assuming that the quantization step size of the block B is Q_B, the quantization step size of the block B1 is Q_B1, the quantization step size of the block B2 is Q_B2, the quantization step size of the block B3 is Q_B3, and the normalized DC values of the blocks B, B1, B2 and B3 are N_DC_B1,N_DC_B ,N_DC_B2 and N_DC_B3 respectively, the DC normalizing method—is—performed as follows.

N_DC_B=DC_B X Q_B

N_DC_B1=DC_B1 X Q_B1

N_DC_B2=DC_B2 X Q_B2

N_DC_B3=DC_B3 H X_B3

After performing normalization in such a manner, the predictive value DC_P for predictively coding the block B to be coded is obtained in the following manner.

If DC_P equals to N_DC_B2, the DC_T equals to N-DC-B2/Q-B & DC-B. Also, if DC_P equals to N_DC_B3, the DC_T equals to N_DC_B3/Q_B & DC_B.

According to another embodiment of the present invention, even if the quantization step sizes of three blocks are different from one another, a predictive block and a predictive coefficient are first selected according to gradients, and then the selected predictive coefficient is normalized as follows:

DC_P-(DC_P H DC_PQ)/QB where DC_PQ corresponds to Q_B2 if DC_P equals to DC_B2, and corresponds to Q_B3 if DC_P equals to DC_B3.

As described above, according to the present invention, the quantity of transmitted information can be reduced by predictively coding DC coefficients of a block to be coded using DC gradients of three neighboring blocks of the block to be coded, thereby maximizing the coding efficiency.

What is claimed is:

1. A block based video coding method comprising the step of selecting coded predictive DC coefficients depending on a difference between coded DC gradients which are coefficients of a plurality of neighboring blocks B1, B2 and B3, of a block B to be coded, wherein when the neighboring blocks B1, B2 and B3 of the block to be coded are all intrablocks, a first value is represented by |(DC-B1)–(DC-B2)|, said first value being an absolute value, said method further comprising the steps of subtracting the DC coefficient of the block B2 (DC-B2) from the DC coefficient of the block B1 (DC-B1) for providing said first value, comparing said first value with a second value, said second value being represented by (DC-B1)–(DC-B3)|, said second value being an absolute value, subtracting the coefficient of the block B3 (DC-B3) from the DC coefficient DC-B1 of the block B1 for providing said second value, and performing DC predictive coding by selecting a predictive value DC-P for predictively coding the quantized DC coefficient DC-B of the block B as the quantized DC coefficient DC-B3 of the block B3 using the quantization step size of block B when the result of the inequality |(DC-B1)–(DC-B2)|<|(DC-B1)–(DC-B3)| is true.

2. A block based video coding method comprising the step of selecting coded predictive DC coefficients depending on a difference between coded DC gradients which are coefficients of a plurality of neighboring blocks B1, B2 and B3, of a block B to be coded, wherein when the neighboring blocks B1, B2 and B3 of the block B to be coded are all intrablocks, a first value is represented by |(DC-B1)–(DC-B2)|, said first value being an absolute value, said method further comprising steps of subtracting the DC coefficient of the block B2 (DC-B2) from the DC coefficient of the block B1 (DC-B1) for providing said first value, comparing said first value with a second value, said second value being represented by |(DC-B1)–(DC-B3)|, said second value being an absolute value, subtracting the DC coefficient of the block B3 (DC-B3) from the DC coefficient of the block B1 for providing said second value, and performing DC predictive coding by selecting a predictive value DC-P for predictively coding the quantized DC coefficient of the block B as the quantized DC coefficient DC-B2 of the block B2 using the quantization step size of the block B when the result of the inequality |(DC-B1)–(DC-B2)|>|(DC-B1–DC-B3)|.

3. A block based video coding method comprising the step of selecting coded predictive DC coefficients depending on a difference between coded DC gradients which are coefficients of a plurality of neighboring blocks B1, B2 and B3, of a block B to be coded, wherein the neighboring blocks are capable of containing shape information, said method further comprising the step of, when shape information is not present in the neighboring blocks B2 and B3 of the block B, setting the predictive value DC-P for predictively coding the quantized DC coefficient of the block B to 128 to perform DC predictive coding.

4. A block based video coding method comprising the step of selecting coded predictive DC coefficients depending on a difference between coded DC gradients which are coefficients of a plurality of neighboring blocks B1, B2 and B3, of a block B to be coded, wherein the neighboring blocks are capable of containing shape information, said method further comprising the step of, when shape information is present only in the block B3 from the neighboring blocks B2 and B3 of the block B, selecting the predictive value DC-P for predictively coding the quantized DC coefficient of the block B as the quantized DC coefficient DC-B3 of the block B3 using the quantization step size of the block B to perform DC predictive coding.

5. A block based video coding method comprising the step of selecting coded predictive DC coefficients depending on a difference between coded DC gradients which are coefficients of a plurality of neighboring blocks B1, B2 and B3, of a block B to be coded, wherein the neighboring blocks are capable of containing shape information, said method further comprising the step of, when shape information is present only in the block B2 from the neighboring blocks B2 and B3 of the block B, selecting the predictive value DC-P for predictively coding the quantized DC coefficient of the block B as the quantized DC coefficient DC-B2 of the block B2 using the quantization step size of the block B to perform DC predictive coding.

6. A block based video coding method comprising the step of selecting coded predictive DC coefficients depending on a difference between coded DC gradients which are coefficients of a plurality of neighboring blocks B1, B2 and B3, of a block B to be coded, wherein the neighboring blocks are capable of containing shape information, said method further comprising the step of, when shape information is present in the neighboring blocks B2 and B3 of the block B and is not present in the block B1, selecting the predictive value DC-P for predictively coding the quantized DC coefficient of the block B as the quantized DC coefficient DC-B3 of the block B3 using the quantization step size of block the block B to perform DC predictive coding.

7. A block based video coding method comprising the step of selecting coded predictive DC coefficients depending on a difference between coded DC gradients which are coefficients of a plurality of neighboring blocks B1, B2 and B3, of a block B to be coded, wherein the neighboring blocks are capable of containing shape information, said method further comprising the step of, when shape information is present in the neighboring blocks B2 and B3 of the block B and is not present in the block B1, selecting the predictive value DC-P for predictively coding the quantized DC coefficient of the block B as the quantized DC coefficient DC-B2 of the block B2 using the quantization step size of the block B to perform DC predictive coding.

8. A block based video coding method comprising the step of selecting coded predictive DC coefficients depending on a difference between coded DC gradients which are coefficients of a plurality of neighboring blocks B1, B2 and B3, of a block B to be coded, wherein the neighboring blocks are capable of containing shape information, said method further comprising the step of, when shape information is not present in the neighboring blocks B2 and B3 of the block B and is present only in the block B1, selecting the predictive value DC-P for predictively coding the quantized DC coefficient of the block B as the quantized DC coefficient DC-B1 of the block B1 using the quantization step size of the block B to perform DC predictive coding.

9. A block based video coding method comprising the step of selecting coded predictive DC coefficients depending on a difference between coded DC gradients which are coefficients of a plurality of neighboring blocks B1, B2 and B3, of a block B to be coded, wherein the neighboring blocks are capable of containing shape information, said method further comprising the step of, when shape information is present in the neighboring blocks B2 and B3 of the block B and is not present in the block B1, selecting the predictive value for predictively coding the quantized coefficient DC-B of the block B to 128, said method still further comprising the steps of subtracting the DC coefficient DC-B2 of the block B2 from the predictive value DC-B for obtaining a first absolute value represented by $|(128)-(DC-B2)|$ to for predictively coding the block B, comparing said first value with a second value, said second value being an absolute value represented by $|(128)-(DC-B3)|$, obtaining said second value by subtracting the DC coefficient DC-B3 of the block B3 from the predictive value for predictively coding the block B, and performing DC predictive coding by selecting a predictive value DC-P for predictively coding the quantized DC coefficient DC-B of the block B as the quantized DC coefficient DC-B3 of the block B3 using the quantization step size of the block B when the result of the inequality $|(128)-(DC-B2)|<|(128)-(DC-B3)|$ is true.

10. A block based video coding method comprising the step of selecting coded predictive DC coefficients depending on a difference between coded DC gradients which are coefficients of a plurality of neighboring blocks B1, B2 and B3, of a block B to be coded, wherein the neighboring blocks are capable of containing shape information, said method further comprising the step of, when shape information is present in the neighboring blocks B2 and B3 of the block B and is not present in the block B1, setting the predictive value DC-P for predictively coding the quantized DC coefficient DC-B of the block B to 128, said method still further comprising the steps of subtracting the DC coefficient DC-B2 of the block B2 from the predictive value for obtaining a first absolute value represented by $|(128)-(DC-B2)|$ for predictively coding the block B1, comparing said first value with a second value, said second value being an absolute value represented by $|(128)-(DC-B3)|$, wherein said second value is the absolute value of the result of subtracting the DC coefficient DC-B3 of the block B3 from the predictive value for predictively coding the block B1, and performing DC predictive coding by selecting a predictive value DC-P for predictively coding the quantized DC coefficient DC-B of the block B as the quantized DC coefficient DC-B2 of the block B2 using the step size of the block B when the result of the inequality $|(128)-(DC-B2)|>|(128)-(DC-B3)|$ is true.

11. A block based video coding method comprising the step of selecting coded predictive DC coefficients depending on a difference between coded DC gradients which are coefficients of a plurality of neighboring blocks B1, B2 and B3, of a block B to be coded, wherein the neighboring blocks are capable of containing shape information, said method further comprising the step of, when shape information is not present in the neighboring blocks B2 and B3 of the block B and is present only in the block B1, setting the predictive value DC-P for predictively coding the quantized DC coefficient DC-B of the block B to the DC coefficient obtained by adding 128 to the quantized DC coefficient DC-B1 of the block B1 using the step size of the block B, that is, DC-B1+128, and dividing the adding result by 2, that is, (DC-B1+128)/2, and then rounding off or cutting the fractions to the decimal places, to then perform DC predictive coding.

12. A block based video coding method comprising the step of selecting coded predictive DC coefficients depending on a difference between coded DC gradients which are coefficients of a plurality of neighboring blocks B1, B2 and B3, of a block B to be coded, wherein the neighboring blocks are capable of containing shape information, said method further comprising the step of, when shape information is present only in the block B3, setting the predictive value DC-P for predictively coding the quantized DC coefficient DC-B of the block B to the DC coefficient obtained by adding 128 to the quantized DC coefficient DC-B3 of the block B3 using the step size of the block B, that is, DC-B3+128, and dividing the adding result by 2, that is, (DC-B3+128)/2, and then rounding off or cutting the fractions to the decimal places, to then perform DC predictive coding.

13. A block based video coding method comprising the step of selecting coded predictive DC coefficients depending on a difference between coded DC gradients which are coefficients of a plurality of neighboring blocks B1, B2 and B3, of a block B to be coded, wherein the neighboring blocks are capable of containing shape information, said method further comprising the step of, when shape information is present only in the block B2, setting the predictive value DC-P for predictively coding the quantized DC coefficient DC-B of the block B to the DC coefficient obtained by adding 128 to the quantized DC coefficient DC-B2 of the block B2 using the step size of the block B, that is, DC-B2+128, and dividing the adding result by 2, that is, (DC-B2+128)/2, and then rounding off or cutting the fractions to the decimal places, to then perform DC predictive coding.

14. A block based video coding method comprising the step of selecting coded predictive DC coefficients depending on a difference between coded DC gradients which are coefficients of a plurality of neighboring blocks B1, B2 and B3, of a block B to be coded, wherein the neighboring blocks are capable of containing shape information, said method further comprising the step of, when shape information is present in the neighboring blocks B2 and B3 of the block B and is not present in the block B1, setting the predictive value DC-P for predictively coding the quantized DC coefficient DC-B of the block B to the DC coefficient obtained by adding the quantized DC coefficient DC-B3 of the block B3 using the step size of the block B to the quantized DC coefficient DC-B2 of the block B2 using the step size of the block B, that is, DC-B2+DC-B3, and dividing the adding result by 2, that is, (DC-B2+DC- B3)/2, and then rounding off or cutting the fractions to the decimal places to then perform DC predictive coding.

15. A block based video coding method comprising the step of selecting coded predictive DC coefficients depending on a difference between coded DC gradients which are coefficients of a plurality of neighboring blocks B2, B2 and B3, of a block B to be coded, wherein the neighboring blocks are capable of containing shape information, said method further comprising the step of, when quantization step sizes of the block B and its neighboring blocks B1, B2 and B3 are different from one another, performing DC predictive coding by calculating the predictive value DC-P for predictively coding the quantized DC coefficient DC-B of the block B after normalizing the DC coefficients of the four blocks B, B1, B2 and B3 with each quantization step size of the corresponding block using the step size of the block B.

16. The predictive video coding method according to claim 15, wherein the method further comprises the step of performing normalization such that a normalized DC value of block B=N-DC-B=(DC-B)×(Q-B), a normalized DC value of Block B1, N-DC-B1=(DC-B)×(Q-B)=a normalized DC value of block B2, N-DC-B2=(DC-B)×(Q-B) and a normalized DC value of block B3, N-DC-B3=(DC-B3)×(Q-B3), where the quantization step size of the block B is Q-B, the quantization step size of the block B1 is Q-B1, the quantization step size of the block B2 is Q-B2, and the quantization step size of the block B3 is Q-B3.

17. The predictive video coding method according to claim 16, wherein when DC-P equals the normalized DC value for block B1, a DC predictor (DC-T) for a current block B to be transmitted to a decoder equals N-DC-B1/(Q-B)-(DC-B);

18. The predictive video coding method according to claim 16, wherein when DC-P equals a normalized DC value for block B2, a DC prediction DC-T equals N-DC-B2/(Q-B)-(DC-B).

19. The predictive video coding method according to claim 16, wherein when DC-P equals the normalized DC value for block B3, a DC predictor DC-T equals N-DC-B3/(Q-B)-(DC-B).

20. The predictive video coding method according to claim 15, wherein when DC-P equals the normalized value for block B1 N-DC-B1, a DC predictor (DC-T) for the current block B to be transmitted to a decoder, equals N-DC-B1/(Q-B)-(DC-B).

21. The predictive video coding method according to claim 15, wherein when DC-P equals the normalized DC value for block B2, N-DC-B2, a DC predictor DC-T equals N-DC-B2/(Q-B)-(DC-B).

22. The predictive video coding method according to claim 15, wherein when DC-P equals the normalized DC value for block B3, N-DC-B3, a DC predictor DC-T equals N-DC-B3/Q-B)-(DC-B).

23. A block based video coding method comprising the step of selecting coded predictive DC coefficients depending on a difference between coded DC gradients which are coefficients of a plurality of neighboring blocks B1, B2 and B3, of a block B to be coded, wherein when quantization step sizes, said quantization step sizes represented by Q-step, of a block to be coded and selected blocks are different from one another after being predictively coded, said method further comprises the step of performing scaling such that the predictive value DC-P=(DC-P×DCP's block Q-step)/DC-B's Q-step) and DC-T=(DC-P–DC-B), and the scaled value is Differential Pulse Code Modulated (DPCM) to then be transmitted.

24. A block based video coding method comprising the step of selecting coded predictive DC coefficients depending on a difference between coded DC gradients which are coefficients of a plurality of neighboring blocks B1, B2 and B3, of a block B to be coded, wherein the blocks have associated quantization step sizes, the quantization step sizes (Q-step) of a block to be coded and selected blocks, are different from one another by being predictively coded, said method further comprising the step of first selecting a predictive block and a predictive coefficient according to gradients, and then normalizing the selected predictive coefficient such that a predictive value DC-P=(DC-P×DC-PQ/QB where DC-PQ corresponds to Q-B2 when DC-P equals DC-B2, and corresponds to Q-B3 when DC-P equals DC-B3.

25. A block based video coding apparatus comprising:
an object boundary block padding means for receiving a first video signal and original shape information, said object block padding means comprising means for filling non-object parts with a mean value of object parts, said object boundary block padding means outputting a second video signal;

a DCT means for receiving the second video signal output from said object boundary block padding means for performing discrete cosine transform, quantizing a transform coefficient, and outputting the quantized transform coefficient;

a transform coefficient and video information coder for receiving DCT means output for predictively coding DC coefficients using spatial correlativity (gradient) between the quantized transform coefficient of an arbitrary block output from said DCT means, and the coded DC values of a plurality of neighboring blocks of the arbitrary block;

an IDCT means for receiving the quantized transform coefficient from said DCT means and inversely quantizing the same, inversely scanning the transform coefficient and performing an inverse discrete cosine transform (IDCT), said IDCT means outputting a third video signal; and a padded data eliminating means for receiving the video signal output from said IDCT means and reconstructed shape information, eliminating padded data, and outputting decoded video object plane video object plane data.

26. The block based video coding apparatus according to claim 25, wherein said transform coefficient and video information coder comprises:

- a DC coefficient storage means for storing the DC coefficient obtained from said DCT means;
- a predictive block selector for selecting a predictive block by indices of three neighboring blocks of a current block, obtained from said DC coefficient storage means; and
- a DPCM coder for Differential Pulse Code Modulating DPCM the predictive value obtained from said predictive block selector and the quantized DC coefficient of the current block, obtained from said DCT means.

27. The block based video coding apparatus according to claim 26, wherein said predictive block selector comprises:

- a memory for storing indices for three neighboring blocks of the current block, obtained from said DC coefficient storage means;
- first and second subtractors for selectively taking a first and second index from the three blocks and subtracting said first index from said second index;
- first and second absolute value calculators for calculating absolute values output from said first and second subtractors; and
- a comparator for comparing the respective absolute values obtained from said first and second absolute value calculators and generating a selection control signal for selecting a predictive block according to the comparison result.

* * * * *